(12) United States Patent
Ota et al.

(10) Patent No.: US 7,622,225 B2
(45) Date of Patent: Nov. 24, 2009

(54) LITHIUM SECONDARY BATTERY NEGATIVE-ELECTRODE COMPONENT MATERIAL AND LITHIUM SECONDARY BATTERY

(75) Inventors: Nobuhiro Ota, Itami (JP); Nobuyuki Okuda, Itami (JP); Hiroyuki Ueki, Itami (JP); Tomohiko Ihara, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 747 days.

(21) Appl. No.: 10/552,125

(22) PCT Filed: May 31, 2004

(86) PCT No.: PCT/JP2004/007877

§ 371 (c)(1),
(2), (4) Date: Oct. 5, 2005

(87) PCT Pub. No.: WO2005/117166

PCT Pub. Date: Dec. 8, 2005

(65) Prior Publication Data

US 2007/0054193 A1    Mar. 8, 2007

(51) Int. Cl.
*H01M 4/66* (2006.01)
*H01M 4/40* (2006.01)
*H01M 2/16* (2006.01)

(52) U.S. Cl. .................. 429/233; 429/231.95; 429/245; 429/246

(58) Field of Classification Search .................. 429/233, 429/231.95, 245, 246
See application file for complete search history.

(56) References Cited

U.S. PATENT DOCUMENTS

| 5,314,765 A | 5/1994 | Bates |
| 6,025,094 A | 2/2000 | Visco et al. |
| 2004/0126654 A1* | 7/2004 | Sudano et al. ............... 429/162 |

FOREIGN PATENT DOCUMENTS

| JP | S61-038585 B2 | 8/1986 |
| JP | H02-094262 A | 4/1990 |
| JP | 2000-340257 A | 12/2000 |
| JP | 2001-307771 A | 11/2001 |
| JP | 2002-097564 A | 4/2002 |
| JP | 2002-100346 A | 4/2002 |
| JP | 2002-329524 A | 11/2002 |
| JP | 2004-146348 A | 5/2004 |
| JP | 2004-146361 A | 5/2004 |

* cited by examiner

*Primary Examiner*—Patrick Ryan
*Assistant Examiner*—Angela J. Martin
(74) *Attorney, Agent, or Firm*—James W. Judge

(57) ABSTRACT

Affords for lithium secondary batteries a negative electrode component material that enhances battery cyclability by inhibiting dendritic growth that occurs during charging/discharging due to the reaction of the metallic lithium and organic electrolyte.

A substrate for a lithium-secondary-battery negative-electrode component material (5), in which a metallic lithium film (3) is formed atop the substrate and onto the metallic lithium film an inorganic solid electrolytic film (4) is formed, is created from an electrical insulator that can be a polyethylene film (1). A configuration providing an electrically insulating layer at the interface between a metal base material and the metallic lithium film may also be utilized as the substrate.

11 Claims, 1 Drawing Sheet

LITHIUM SECONDARY BATTERY NEGATIVE-ELECTRODE COMPONENT MATERIAL AND LITHIUM SECONDARY BATTERY

TECHNICAL FIELD

The present invention relates to negative-electrode component materials for superior capacity, superior safety lithium secondary batteries excelling in cyclability, and to lithium secondary batteries utilizing the component materials.

BACKGROUND ART

As a way of improving the volumetric and gravimetric capacity density of secondary lithium-ion batteries, production methods in which lithium in metallic form is accumulated within a negative electrode have been investigated as an alternative to the traditional methods that employ the intercalation of lithium ions into graphite. With the alternative methods, however, the lithium and the battery's organic electrolyte react, which when the battery charges/discharges turns the lithium into branchy crystals and gives rise to dendritic lithium growth that precipitates out of the electrode. As a consequence, the electrode performs less efficiently and the battery's cycling life is shortened. What is more, such lithium dendrites give rise to battery-internal shorting with the positive electrode, which presents a hazard that ultimately ends in the battery exploding.

One technique that has been investigated to date for curbing dendritic growth is the formation on the surface of the metallic lithium of a polymer film, or a solid electrolytic film such as a fluoride film, a carbonic film, an oxide film, an oxide-nitride film or a sulfide film; such films are disclosed in U.S. Pat. No. 5,314,765 (cf. claim 1), U.S. Pat. No. 6,025,094 (cf. claims 1 and 4), Japanese Unexamined Pat. App. Pub. No. 2000-340257 (cf. claims 6 and 7), and Japanese Unexamined Pat. App. Pub. No. 2002-329524 (cf. claims 1 and 9).

Given the objective of raising a lithium secondary battery's capacity per unit volume and weight, the metallic lithium must have a layer thickness that is kept to 20 μm or less, preferably to 5 μm or so, but freestanding lithium foil in that thickness range is so weak as to be unusable, thus rendering it necessary to use as a substrate a current-collecting material having strength, such as copper foil, and laminate the lithium foil onto it, or to form the lithium metallic layer onto a substrate by a gas-phase deposition technique such as chemical vapor deposition.

To date, an electroconductive substance such as copper foil has been employed as a negative-electrode substrate in secondary lithium-ion batteries.

Meanwhile, with techniques that form a solid electrolytic film onto metallic lithium to restrain the lithium from growing dendritically, in the course of producing and in the process of handling the negative electrode there is a likelihood that partial breakdown of the strongly hydrolytic metallic lithium layer and the sulfide-based solid electrolytic film will occur, which is assumed to be the coating effectiveness from the solid electrolytic film not manifesting itself. When such a situation occurs, in the compromised portions of the electrode the solid electrolytic film is destroyed and dendritic growth arises, which brings on a decline in the battery's cycling life. And in implementations in which an electroconductive material is employed as a substrate, the fact that electrons keep on being supplied to the negative electrode increases the likelihood that charging/discharging will concentrate where the electrons are being supplied. What is more, the encroachment of negative-electrode dendritic growth brings about battery-internal shorting between the negative and positive electrodes, which presents a hazard that ultimately ends in the battery exploding.

DISCLOSURE OF INVENTION

An issue for the present invention is to eliminate such pitfalls and enhance the cyclability and safety of a negative-electrode component material for lithium secondary batteries.

The inventors discovered that by utilizing an electrical insulator as the substrate, the technical problem of concentrated growth of dendrites is resolved in a lithium secondary battery negative-electrode component material in which a metallic lithium film and a solid electrolytic film are formed onto the substrate. Effectiveness in inhibiting dendritic growth can especially be enhanced by utilizing an organic high-polymer material as the substrate.

The same technical difficulty can also be resolved with a configuration that provides an electrically insulating layer atop a metal base material, and has that construction be the substrate. The metal base material may be copper, iron, stainless steel, nickel or aluminum, and the electrically insulating layer may be formed on the metal base material by coating it with an organic high-polymer material. Inasmuch as the part that serves as the base of the substrate is in that case metal foil, sufficient mechanical strength in the negative electrode can be secured.

Although polyvinyls such as polyethylene and polypropylene are routinely employed as organic high-polymer materials, polyimides, polyamides, polyesters, polyethers, polyurethanes, or polycarbonates may also be, in that the objectives of the invention can be achieved with substrates employing these and like materials.

The negative electrode component material of the invention causes the metallic lithium layer formed onto these insulative substrates to act as the negative electrode active substance and at the same time makes the layer function as a current-collecting material.

Thus, even should a deficiency situation arise and the performance of the solid electrolytic film decline, leading to the local occurrence of dendritic growth on the negative electrode, the metallic lithium in that portion of the negative electrode becoming spent will automatically cease the supply of electrons, eliminating the hazardousness of concentrated charging/discharging repeating in that region.

In the present invention, a lithium secondary battery utilizing such a negative electrode component material is additionally made available.

BEST MODE FOR CARRYING OUT THE INVENTION

Embodiment 1

Figure 1:
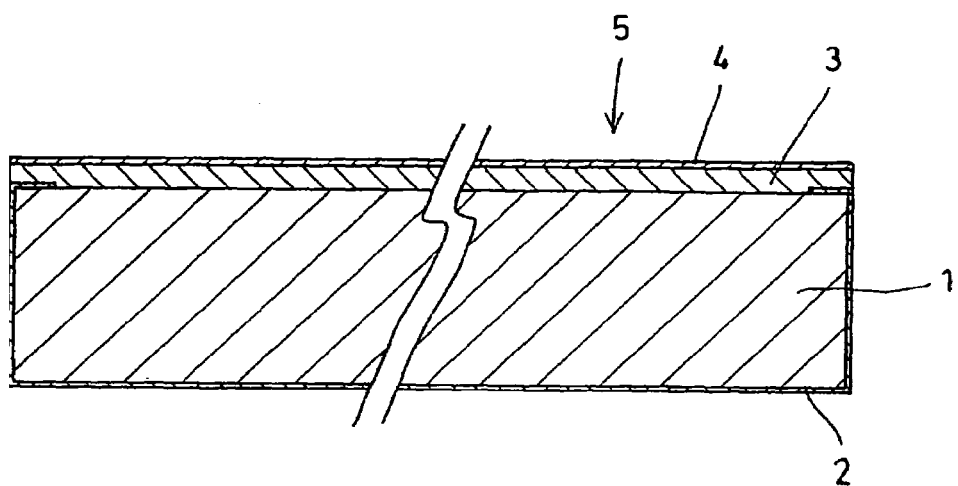
FIG. 1 is a sectional view illustrating one example of a negative electrode component material of the invention.

With a polyethylene film of 100 μm thickness, 30 mm diameter as a substrate, a thin copper film 2 as illustrated in FIG. 1 was formed to 0.1 μm thickness by vapor deposition over the entire back-side surface, the side surfaces, and an area of approximately 0.5 mm width along the peripheral margin of the upper surface of the polyethylene film 1.

Then a metallic lithium film 3 was subsequently formed by vapor deposition onto the entire top-side surface. The metallic lithium film 3 measured 5 μm in thickness. The film-thickness measurement was performed using a stylus profilometer. Further, a solid electrolytic film 4 that was a lithium (Li)-phosphorous (P)-sulfur (S) composition was vapor-deposited to 0.5 μm thickness onto the metallic lithium film 3, producing a negative electrode component material 5. Therein, an assay of the solid electrolytic film 4 indicated that it was in the form of a non-crystalline composition of 34 atomic % Li, 14 atomic % P, and 52 atomic % S.

The positive electrode was prepared by mixing, together with an organic solvent, $LiCoO_2$ particles to serve as the active substance, carbon particles to contribute to the electron conductivity, and poly(vinylidene fluoride), and then spreading the mixture onto aluminum foil. The active-substance layer had a thickness of 100 μm, a capacity density of 3 mAh (milliampere-hours)/cm$^2$, and a total capacity of 21 mAh. Furthermore, the diameter of the positive electrode was 30 mm.

Under an argon-gas atmosphere having a dew point not greater than −80° C., 100 lithium secondary batteries were prepared as Sample No. 1 by setting into coin-type cells the above-described negative-electrode component material 5, a separator (porous polymer film), and the positive-electrode component material, and by dripping into the cells an organic electrolyte in which 1 mol % $LiPF_6$ was dissolved as an electrolyte salt into a mixed solution of ethylene carbonate and dimethyl carbonate.

Next, a charge-discharge cycling test was run on these sample articles. The conditions under which the cycling test was implemented were a constant current of 10 mA, a charging voltage of 4.2 V, and a discharging voltage of 3.0 V. The cycling-test results (lifespan) for Sample No. 1 are set forth in the table. As is evident from these results, internal shorting did not occur in any of the 100 Sample No. 1 batteries even after 500 cycles. Moreover, the good-product yield was 100%, with no recognizable loss in capacity.

Following the charge-discharge cycling test the coin cells were taken apart and the negative electrodes removed. The negative electrodes were observed under, and subjected to energy-dispersive X-ray (EDX) analysis with, a scanning electron microscope (SEM). The results were that with 95 of the lithium secondary-battery negative electrodes no dendritic growth of metallic lithium was recognizable, confirming that the solid electrolyte film had been retained on the surface of the electrodes.

As to the five remaining battery electrodes meanwhile, although it was observed that the solid electrolyte film had partially broken down, giving rise to local dendritic growth, the dendritic growth ceased in the initial stages, with the issuing growth being arrested near the surface of the negative electrodes.

Embodiment 2

Figure 2:
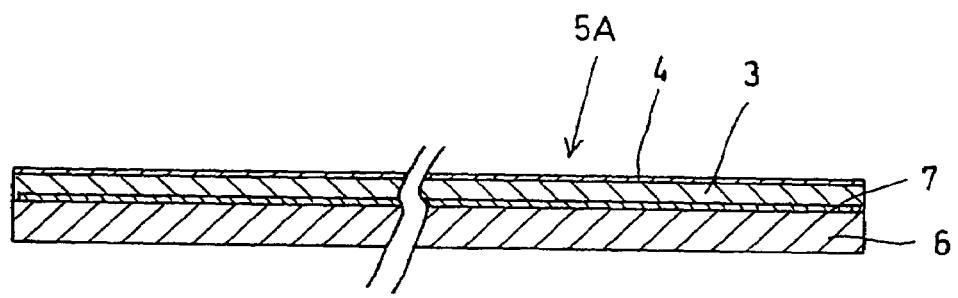
FIG. 2 is a sectional view illustrating another embodiment of an electrode component material.

A polyethylene film 7 as represented in FIG. 2 was tape-cast to a thickness of 1 μm using a mask on the upper surface of copper foil 6 of 10 μm thickness, save for a strip 0.5 mm in width along the peripheral margin of the top surface.

A metallic lithium film 3 was subsequently formed by vapor deposition onto the entire top-side surface. The metallic lithium film 3 measured 5 μm in thickness. The film-thickness measurement was performed using a stylus profilometer. Further, a solid electrolytic film 4 that was a lithium (Li)-phosphorous (P)-sulfur (S) composition was vapor-deposited to 0.2 μm thickness onto the metallic lithium film 3, producing a negative electrode component material 5A. Therein, an assay of the solid electrolytic film 4 indicated that it was in the form of a non-crystalline composition of 34 atomic % Li, 14 atomic % P, and 52 atomic % S.

The positive electrode was prepared by mixing, together with an organic solvent, $LiCoO_2$ particles to serve as the active substance, carbon particles to contribute to the electron conductivity, and poly(vinylidene fluoride), and then spreading the mixture onto aluminum foil. The active-substance layer had a thickness of 100 μm, a capacity density of 3 mAh (milliampere-hours)/cm$^2$, and a total capacity of 21 mAh. Furthermore, the diameter of the positive electrode was 30 mm.

Under an argon-gas atmosphere having a dew point not greater than −80° C., 100 lithium secondary batteries were prepared as Sample No. 2 by setting into coin-type cells the above-described negative-electrode component material 5A, a separator (porous polymer film), and the positive-electrode component material, and by dripping into the cells an organic electrolyte in which 1 mol % $LiPF_6$ was dissolved as an electrolyte salt into a mixed solution of ethylene carbonate and propylene carbonate.

Thereafter, a charge-discharge cycling test was run on these sample articles. The cycling test conditions were the same as with Embodiment 1: a constant current of 10 mA, a charging voltage of 4.2 V, and a discharging voltage of 3.0 V. The cycling-test results for Sample No. 2 are set forth in the table. As is evident from these results, internal shorting did not occur in any of the 100 Sample No. 2 batteries even after 500 cycles. Moreover, the good-product yield was 100%, with no recognizable loss in capacity.

Following the charge-discharge cycling test the coin cells, likewise as with Embodiment 1, were taken apart and the negative electrodes removed. The negative electrodes were likewise observed under, and subjected to energy-dispersive X-ray (EDX) analysis with, a scanning electron microscope (SEM). The results were that with 95 of the lithium secondary-battery negative electrodes no dendritic growth of metallic lithium was recognizable, which confirmed that the solid electrolyte film had been retained on the surface of the electrodes.

As to the five remaining battery electrodes meanwhile, although it was observed that the solid electrolyte film had partially broken down, giving rise to local dendritic growth, the dendritic growth ceased in the initial stages, with the issuing growth being arrested near the surface of the negative electrodes.

Embodiment 3

In sample sets of 100, batteries of the same configuration as those of Embodiment 1, but for each set of which the substrate was changed, were prepared. The cyclability of the batteries produced (Sample Nos. 3 through 9) was examined by the same method as in Embodiment 1. The results are set forth in Table.

With Sample Nos. 3 through 9 as well the good-product yield was 100% in every case.

TABLE

| Sample | Negative electrode substrate Substrate substance | Subst. thickness (μm) | Test results Good-product yield (%) |
|---|---|---|---|
| No. 1 | Polyethylene | 100 | 100 |
| No. 2 | Copper/polypropylene | 10/1 | 100 |
| No. 3 | Polyethylene terephthalate (Product name: Tetron ®) | 10 | 100 |
| No. 4 | Aromatic polyamide (Product name: Nomex ®) | 10 | 100 |
| No. 5 | Polyamide (Product name: nylon) | 10 | 100 |
| No. 6 | Aromatic polyamide | 5 | 100 |
| No. 7 | Polyethylene oxide | 10 | 100 |
| No. 8 | Polyurethane | 15 | 100 |
| No. 9 | Polycarbonate | 10 | 100 |

COMPARATIVE EXAMPLE 1

One-hundred lithium secondary batteries of configuration likewise as with Embodiment 1 but using rolled copper foil as the substrate were prepared, with the negative electrode being a component material in which the metallic lithium film and the solid electrolytic film were formed on the copper-foil substrate, and as a comparative test the batteries were run through a charge-discharge cycling test under the same conditions as in Embodiment 1.

The results were that due to voltage elevation at roughly 300 to 500 cycles, in 97 of the batteries cycling came to a stop. And in the three remaining batteries, shorting occurred at about 100 cycles.

In this case too, following the charge-discharge cycling test the coin cells were taken apart and the negative electrodes removed; and the negative electrodes were observed under, and subjected to energy-dispersive X-ray (EDX) analysis with, a scanning electron microscope (SEM). Therein, as far as the negative electrodes from the batteries that demonstrated a lifespan of 300 cycles or more were concerned, no dendritic growth of metallic lithium was recognizable, confirming that the solid electrolyte film had been retained on the surface of the electrodes, but as far as the negative electrodes in which in which shorting occurred were concerned, local dendritic growth arose, and it was confirmed that the growth had reached as far as the positive electrodes.

INDUSTRIAL APPLICABILITY

As described in the foregoing, in accordance with the present invention the substrate of a negative electrode component material is formed from a constituent material provided with an electrical insulator, or an electrically insulating layer atop a metal base material, and a metallic lithium film and a solid electrolytic film are provided atop the substrate, and this configuration inhibits dendritic growth from arising by the reaction of the metallic lithium and the organic electrolyte. What is more, even if local dendritic growth temporarily occurs, by the metallic lithium in that region of the negative electrode becoming spent the supply of electrons will automatically stop. Accordingly, shorting originating in dendritic growth is eliminated, which yields a high-energy-density, highly stable, highly safe lithium secondary battery excelling in charge-discharge cyclability.

The invention claimed is:

1. A lithium-secondary-battery negative-electrode component material comprising:
    an electrically insulating substrate;
    a metallic lithium film formed onto said substrate; and
    an inorganic solid electrolytic film formed onto said metallic lithium film.

2. A lithium-secondary-battery negative-electrode component material as set forth in claim 1, further comprising:
    a metal base material on said electrically insulating substrate, on its opposite side from where said metallic lithium film is formed.

3. A lithium-secondary-battery negative-electrode component material as set forth in claim 1, wherein said electrically insulating substrate is an organic high-polymer material.

4. A lithium-secondary-battery negative-electrode component material as set forth in claim 2, wherein said metal base material is any from among copper, iron, stainless steel, nickel and aluminum.

5. A lithium-secondary-battery negative-electrode component material as set forth in claim 3, wherein said organic high-polymer material is either polyethylene or polypropylene.

6. A lithium-secondary-battery negative-electrode component material as set forth in claim 3, wherein said organic high-polymer material is any from among polyimides, polyamides, polyesters, polyethers, polyurethanes, and polycarbonates.

7. A lithium secondary battery configured utilizing a negative-electrode component material as set forth in claim 1.

8. A lithium-secondary-battery negative-electrode component material as set forth in claim 2, wherein said electrically insulating substrate is an organic high-polymer material.

9. A lithium-secondary-battery negative-electrode component material as set forth in claim 8, wherein said organic high-polymer material is either polyethylene or polypropylene.

10. A lithium-secondary-battery negative-electrode component material as set forth in claim 8, wherein said organic high-polymer material is any from among polyimides, polyamides, polyesters, polyethers, polyurethanes, and polycarbonates.

11. A lithium secondary battery configured utilizing a negative-electrode component material as set forth in claim 2.

* * * * *

UNITED STATES PATENT AND TRADEMARK OFFICE
CERTIFICATE OF CORRECTION

PATENT NO.       : 7,622,225 B2
APPLICATION NO.  : 10/552125
DATED            : November 24, 2009
INVENTOR(S)      : Ota et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1082 days.

Signed and Sealed this

Twenty-sixth Day of October, 2010

David J. Kappos
*Director of the United States Patent and Trademark Office*